(12) United States Patent
Yamano (10) Patent No.: US 12,019,357 B2
(45) Date of Patent: Jun. 25, 2024

(54) PROJECTOR DEVICE WITH IMAGING LENS

(71) Applicant: SEIKO EPSON CORPORATION, Tokyo (JP)

(72) Inventor: Daigo Yamano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/751,850

(22) Filed: May 24, 2022

(65) Prior Publication Data

US 2022/0373868 A1 Nov. 24, 2022

(30) Foreign Application Priority Data

May 24, 2021 (JP) .................................. 2021-086725

(51) Int. Cl.
*G03B 21/14* (2006.01)
*G03B 17/54* (2021.01)

(52) U.S. Cl.
CPC ........... *G03B 17/54* (2013.01); *G03B 21/145* (2013.01)

(58) Field of Classification Search
CPC .... G03B 21/006; G03B 21/008; G03B 21/28; G03B 21/134; G03B 21/145; G03B 21/2033; G03B 17/54; G03B 17/56; G03B 17/561; H04N 9/3105; H04N 9/3141; H04N 9/3179; H04N 9/3194
See application file for complete search history.

(56) References Cited

U.S. PATENT DOCUMENTS

| | | | | |
|---|---|---|---|---|
| 2010/0002123 A1* | 1/2010 | Nozaki | ................. | H04N 23/00 348/E5.022 |
| 2011/0187943 A1* | 8/2011 | Cox | ...................... | G06F 1/1639 348/789 |
| 2013/0265551 A1* | 10/2013 | Yamano | ............... | G03B 21/145 353/30 |
| 2015/0049309 A1* | 2/2015 | Sumiyoshi | ........... | H04N 9/3179 353/31 |
| 2015/0138513 A1* | 5/2015 | Ichieda | ................ | H04N 9/3185 353/121 |
| 2015/0323859 A1* | 11/2015 | Fujikawa | ................ | G03B 21/10 353/79 |
| 2016/0259402 A1* | 9/2016 | Masuda | .................... | H04N 9/31 |
| 2017/0208307 A1* | 7/2017 | Ichieda | ................ | H04N 9/3185 |
| 2021/0165309 A1* | 6/2021 | Kubota | ................ | G03B 21/208 |
| 2021/0235050 A1* | 7/2021 | Shishido | ............... | H04N 9/3194 |
| 2021/0356849 A1* | 11/2021 | McNeeley | ............... | G01C 9/28 |

FOREIGN PATENT DOCUMENTS

JP 2011-180804 A 9/2011

* cited by examiner

*Primary Examiner* — Sultan Chowdhury
(74) *Attorney, Agent, or Firm* — Dority & Manning, P.A.

(57) ABSTRACT

The projector includes an exterior chassis provided with a housing section, a light source unit which is housed in the exterior chassis, and is configured to emit light, an image forming unit which is housed in the exterior chassis, and is configured to generate image light from the light, a projection optical unit which is attached to the exterior chassis, and is configured to project the image light, and an imaging unit which is configured to image the image light projected, and is detachably attached, wherein the imaging unit is housed in the housing section.

12 Claims, 10 Drawing Sheets

PROJECTOR DEVICE WITH IMAGING LENS

The present application is based on, and claims priority from JP Application Serial Number 2021-086725, filed May 24, 2021, the disclosure of which is hereby incorporated by reference herein in its entirety.

BACKGROUND

1. Technical Field

The present disclosure relates to a projector.

2. Related Art

In, for example, JP-A-2011-180804 (Document 1), there is disclosed a technology of attaching an imaging device for taking an image projected from a projector on as upper surface of a chassis of the projector using a hook-and-loop fastener in order to automatically perform distortion or focus adjustment of the projected image.

However, in the technology in Document 1, it results in that the whole of the imaging device protrudes from the upper surface of the chassis of the projector, and there is a problem that the projector grows in size.

SUMMARY

A projector includes an exterior chassis provided with a housing section, a light source unit which is housed in the exterior chassis, and is configured to emit light, an image forming unit which is housed in the exterior chassis, and is configured to generate image light from the light, a projection optical unit which is attached to the exterior chassis, and is configured to project the image light, and an imaging unit which is configured to image the image light projected, and is detachably attached, wherein the imaging unit is housed in the housing section.

A projector includes an exterior chassis, a housing section which is provided to the exterior chassis, and is configured to house an imaging unit which images image light projected, and is detachably attached, a light source unit which is housed in the exterior chassis, and is configured to emit light, an image forming unit which is housed in the exterior chassis, and is configured to generate the image light from the light, and a projection optical unit which is attached to the exterior chassis, and is configured to project the image light.

DESCRIPTION OF AN EXEMPLARY EMBODIMENT

In each of the drawings described below, the description will be presented defining three axes perpendicular to each other as an X axis, a Y axis, and a Z axis. A direction along the X axis is referred to as an "X direction," a direction along the B axis is referred to as a "Y direction," and a direction along the Z axis is referred to as a "Z direction," and an arrow direction is defined as a "+" direction while a direction opposite to the "+" direction is defined as a "−" direction. It should be noted that the +Z direction is also referred to as an "upper side" or "above" and the −Z direction is also referred to as a "lower side" or "below" in some cases, and a view from the +Z direction is also referred Co as a plan view or planar. Further, the description will be presented defining a surface at a "+" side in the Z direction as an upper surface, and a surface at a "−" side in the Z direction which is an opposite side thereto as a lower surface.

First, a configuration of a projector 1000 will be described with reference to FIG. 1.

Figure 1:
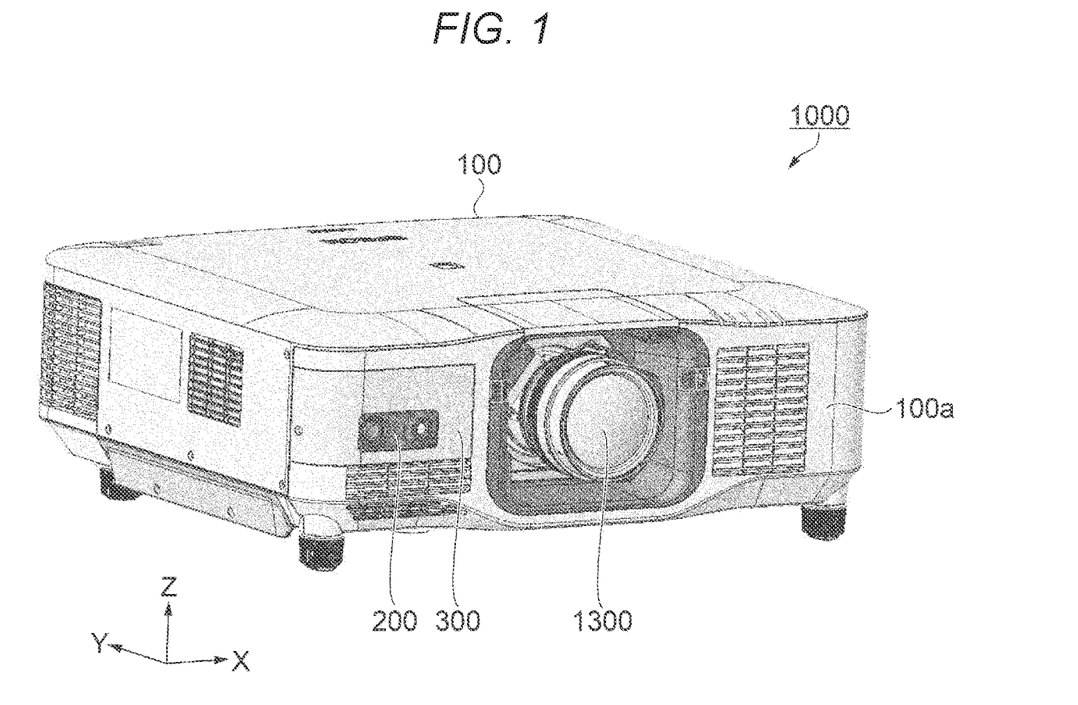
FIG. 1 is perspective view showing a configuration of a projector.

As shown in FIG. 1, the projector 1000 is provided with an exterior chassis 100, a projection optical unit 1300 disposed at a first surface 100a side of the exterior chassis 100, an imaging unit 200 disposed at the −X direction side of the projection optical unit 1300 on the first surface 100a, and a cover part 300 which covers the imaging unit 200. The projector 1000 modulates image light projected from the projection optical unit 1300 in accordance with the image information to project an image on a projection target surface such as a screen in an enlarged manner.

The imaging unit 200 is an imaging device for imaging the image light projected from the projection optical unit 1300 to automatically perform a distortion or focus adjustment of the image light. The imaging device is provided with an imaging element such as a CCD (Charge Coupled Device) or a CMOS (Complementary Metal Oxide Semiconductor).

Further, the exterior chassis 100 is provided with a housing section 400 which is recessed toward the inside of the exterior chassis 100, which houses the imaging unit 200, and which is located at a corner (at the −X direction side) in one end portion of the first surface 100a. The exterior chassis 100 is provided with the cover part 300 for covering the imaging unit 200 housed inside the housing section 400.

Then, an internal configuration of the projector 1000 will be described with reference to FIG. 2.

Figure 2:
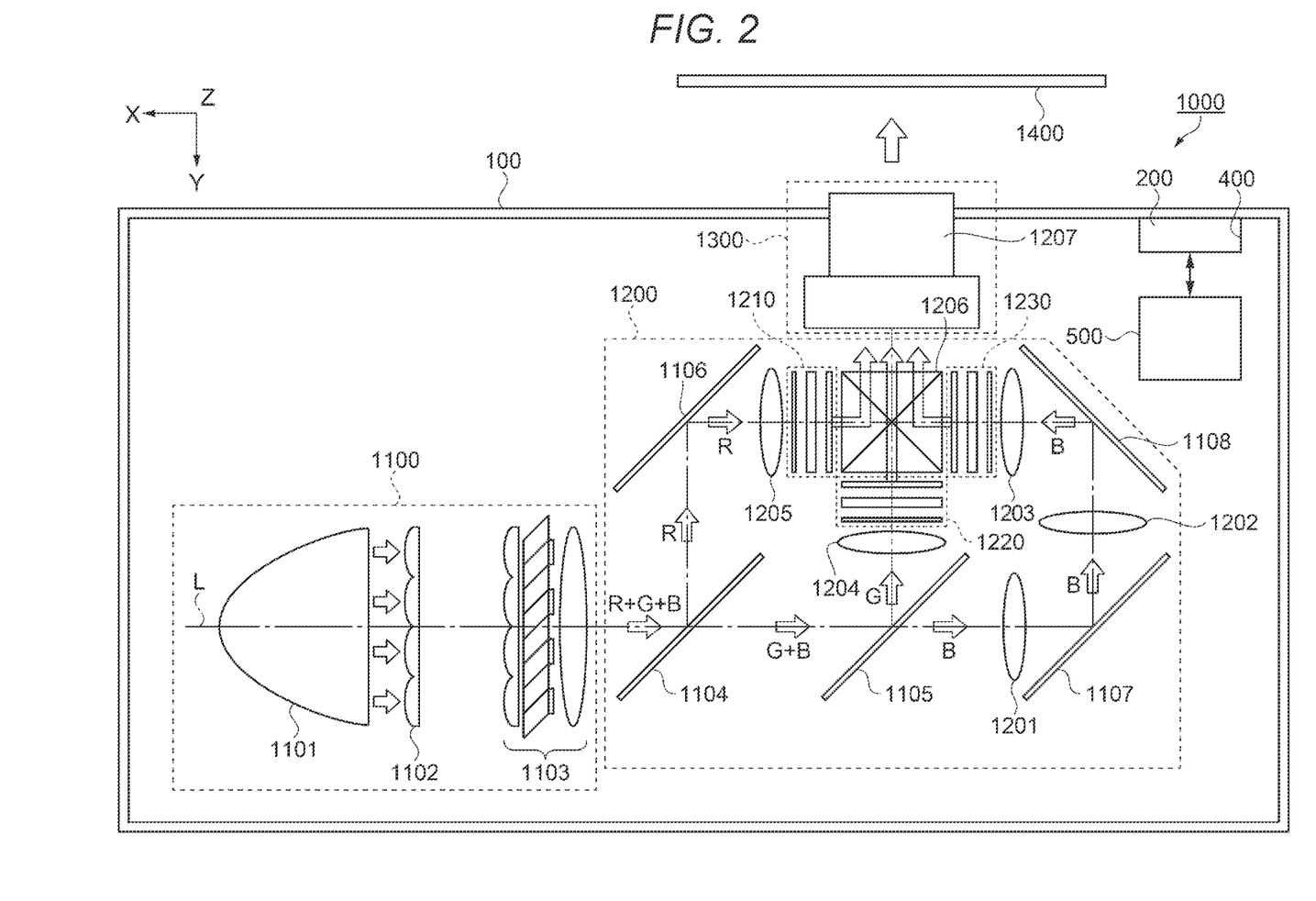
FIG. 2 is a diagram showing an internal configuration of the projector.

As shown in FIG. 2, the projector 1000 is provided with the exterior chassis 100, the imaging unit 200, a light source unit 1100, an image formation unit 1200, the projection optical unit 1300, and a controller 500. The light source unit 1100, the image formation unit 1200, and the projection optical unit 1300 are arranged along a system optical axis L.

The exterior chassis 100 has a plurality of cases such as an upper case constituting an upper part of the exterior chassis 100, and a lower case constituting a lower part of the exterior chassis 100. As described above, the exterior chassis 100 is provided with the housing section 400 for housing the imaging unit 200.

The light source unit 1100 is configured including a lamp unit 1101 formed of a white light source such as a ultrahigh pressure mercury lamp or a halogen lamp, an integrator lens 1102, and a polarization conversion element 1103.

The image formation unit 1200 is a section for generating the image light from light emitted from the light source unit 1100, and is provided with two dichroic mirrors 1104, 1105 as a light separation element. Further, there are also provided three reflecting mirrors 1106, 1107, and 1108, and five relay lenses 1201, 1202, 1203, 1204, and 1205. Further, there are provided transmissive liquid crystal light valves 1210, 1220, and 1230 as three light modulators, and a cross dichroic prism 1206 as a light combining element.

The dichroic mirror 1104 reflects red light (R) while transmitting green light (G) and blue light (B) out of a polarized light beam emitted from the light source unit 1100. Another dichroic mirror 1105 reflects the green light (G) transmitted through the dichroic mirror 1104 while transmitting the blue light (B).

The red light (R) reflected by the dichroic mirror 1104 is reflected by the reflecting mirror 1106, and then enters the liquid crystal light valve 1210 via the relay lens 1205. The green light (G) reflected by the dichroic mirror 1105 enters the liquid crystal light valve 1220 via the relay lens 1204. The blue light (B) transmitted through the dichroic mirror 1105 enters the liquid crystal light valve 1230 via a light guide system constituted by the three relay lenses 1201, 1202, and 1203 and the two reflecting mirrors 1107, 1108.

The liquid crystal light valves 1210, 1220, and 1230 are arranged so as to be opposed respectively to planes of incidence of the colored light beams of the cross dichroic prism 1206. The colored light beams having respectively entered the liquid crystal light valves 1210, 1220, and 1230 are modulated based on video information (a video signal), and are then emitted toward the cross dichroic prism 1206. This prism is formed by bonding four rectangular prisms to each other, and is provided with a dielectric multilayer film for reflecting the red light and a dielectric multilayer film for reflecting the blue light formed on the inside surfaces so as to form a crisscross. The three colored light beams are combined with each other by these dielectric multilayer films, and thus the light expressing a color image is synthesized.

The projection optical unit 1300 is arranged in a replaceable manner, and is provided with a projection lens 1207 which partially projects from the exterior chassis 100. Specifically, the projection optical unit 1300 is attached to the exterior chassis 100 via a lens holder and a lens shifting mechanism not shown. The image light thus synthesized is projected on a screen 1400 by the projection lens 1207, and thus the image is displayed in an enlarged manner.

In the liquid crystal light valve 1210, a pair of polarization elements respectively arranged at the incident side and the exit side of the colored light of a liquid crystal device not shown in a cross-Nicol arrangement are arranged at a distance. The same applies to the other liquid crystal light valves 1220, 1230.

The controller 500 is provided with electronic components such as a CPU (Central Processing Unit), a ROM (Read Only Memory), a RAM (Random Access Memory), and so on. The controller 500 performs control of an operation of each section of the projector 1000 such as control related to the projection of the image. In particular in the case of the present embodiment, the controller 500 controls the image based on the image information obtained by the imaging unit 200.

Then, a procedure of attaching the imaging unit 200 to the projector 1000, and a configuration of the housing section 400, in particular, are described with reference to FIG. 3 through FIG. 13.

Figure 3:
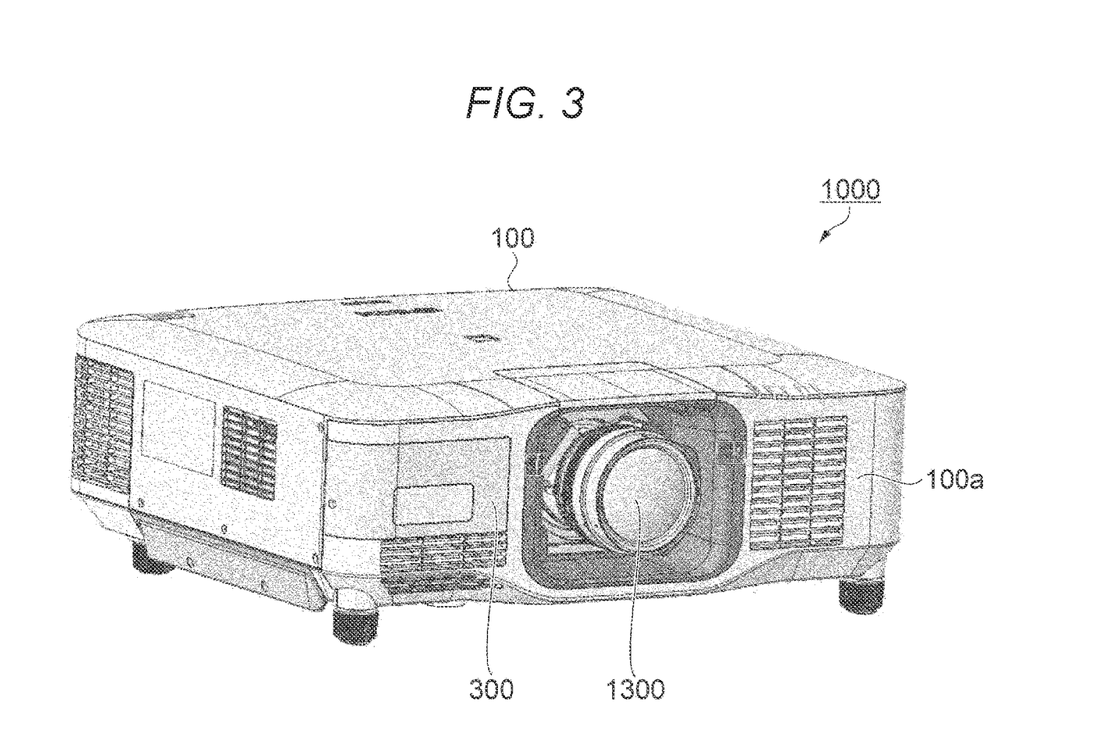
FIG. 3 is a perspective view showing the configuration of the projector.

First, as shown in FIG. 3, there is prepared the projector 1000. On the first surface 100a of the exterior chassis 100 of the projector 1000, there is mounted the cover part 300.

Figure 4:
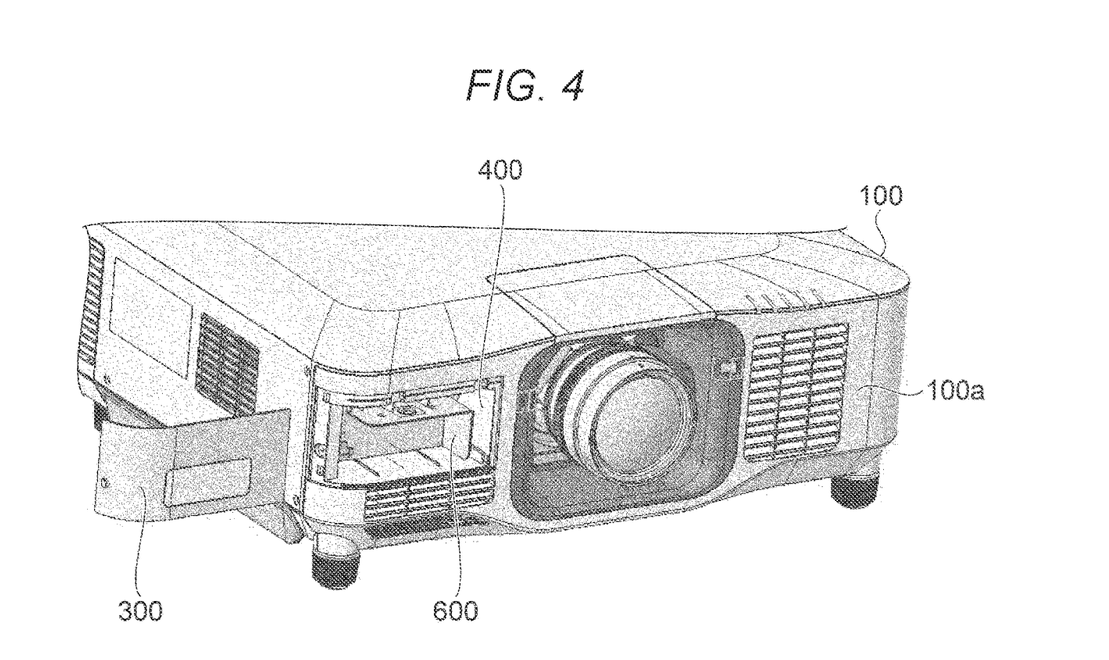
FIG. 4 is a perspective view showing a configuration of a part of the projector.
Figure 5:
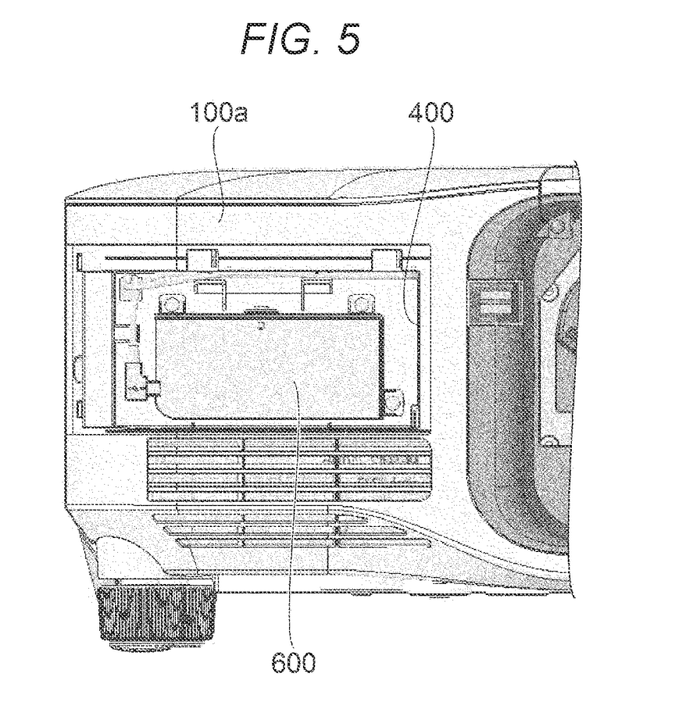
FIG. 5 is a front view showing a configuration of a housing section.

Then, as shown in FIG. 4, the cover part 300 is detached from the exterior chassis 100. It is possible for the cover part 300 to be fixed to the exterior chassis 100 with a screw, or can also be fitted therein along a guide groove. By detaching the cover part 300 from the exterior chassis 100, the housing section 400 for housing the imaging unit 200 appears on the first surface 100a of the exterior chassis 100 as shown in FIG. 4 and FIG. 5. It should be noted that in the housing section 400, there is disposed a fixation member 600 for attaching the imaging unit 200.

Figure 6:
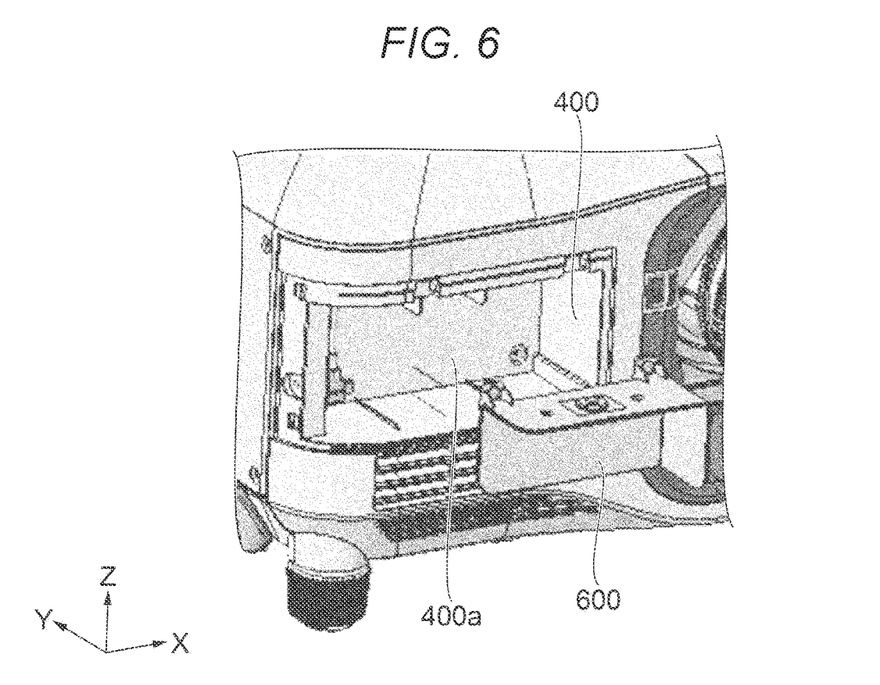
FIG. 6 is a perspective view showing the configuration of the housing section.
Figure 8:
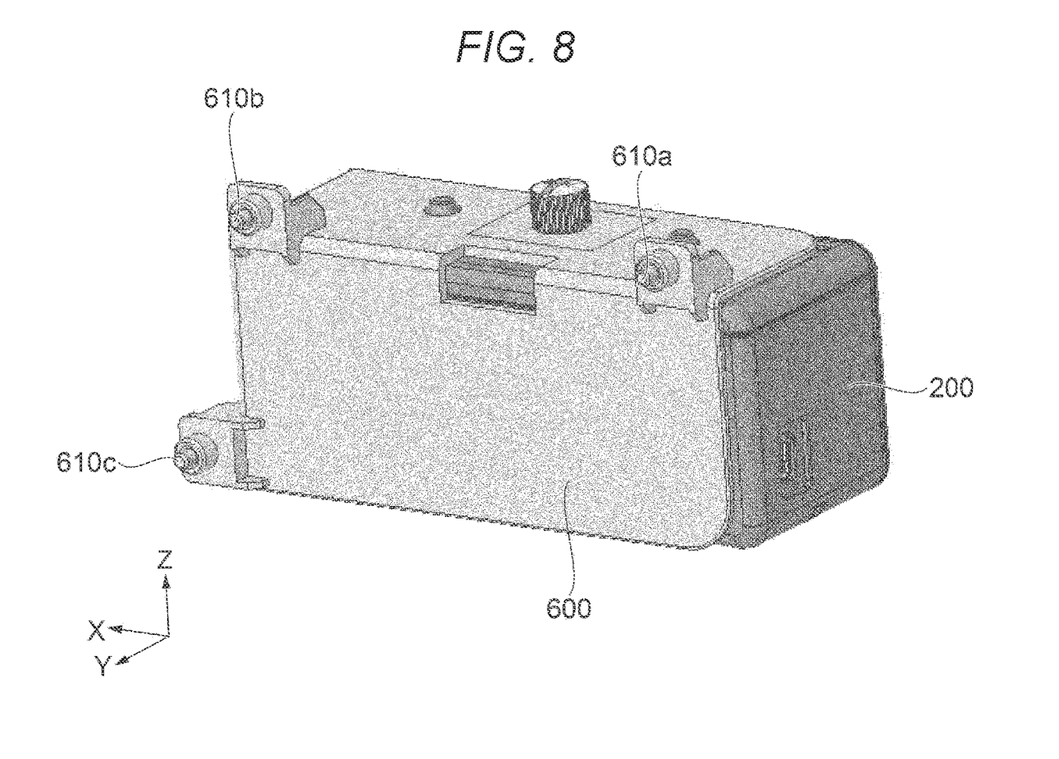
FIG. 8 is a perspective view showing the configuration when combining the imaging unit and the fixation member with each other.

Then, as shown in FIG. 6, the fixation member 600 is detached from the housing section 400. The fixation member 600 is fixed to, for example, a side surface 400a at the +Y direction side in the housing section 400 with such three screws 610a, 610b, and 610c as shown in FIG. 8. By fixing the fixation member 600 at least with the two screws 610a, 610b in the X direction and the one screw 610c in the Z direction, it is possible to prevent the fixation member 600 from rotating in a plane direction of the side surface 400a. It should be noted that it is also possible to arrange that the fixation member 600 is fixed with the two screws 610a, 610b in the X direction.

Figure 7:
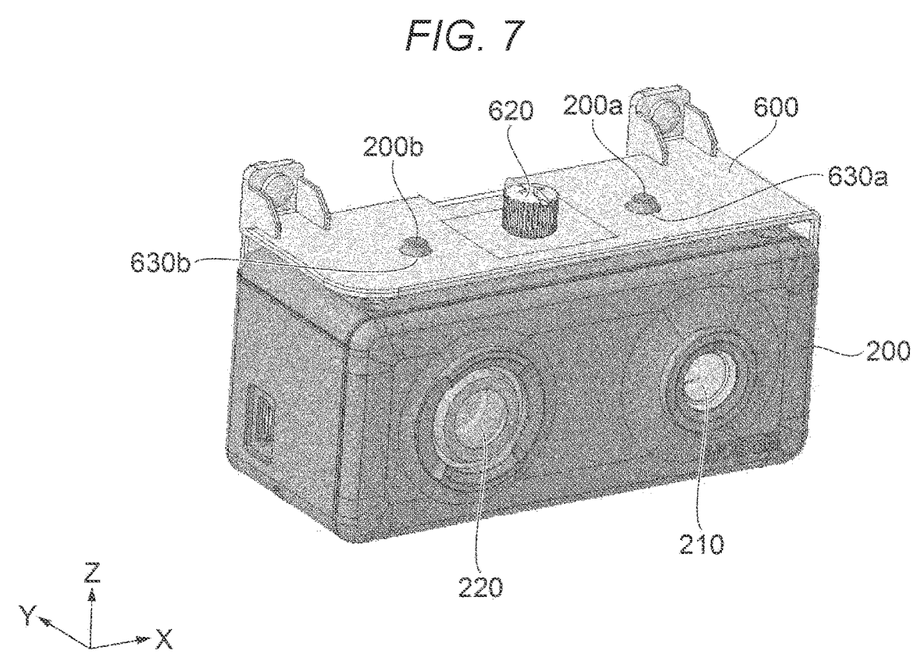
FIG. 7 is a perspective view showing a configuration when combining an imaging unit and a fixation member with each other.

Then, as shown in FIG. 7, the imaging unit 200 is attached to the fixation member 600. The fixation member 600 and the imaging unit 200 are fixed to each other with a fixation screw 620. Regarding the relative alignment between the fixation member 600 and the imaging unit 200, it is possible to align the respective positions by fitting protrusions 200a, 200b as a positioning mechanism provided to the imaging unit 200 in opening holes 630a, 630b as a positioning mechanism provided to the fixation member 600. It should be noted that the positioning mechanisms are each arranged at both sides across the fixation screw 620. Thus, the position in the height direction (the Z direction) in the imaging unit 200 is decided.

Figure 9:
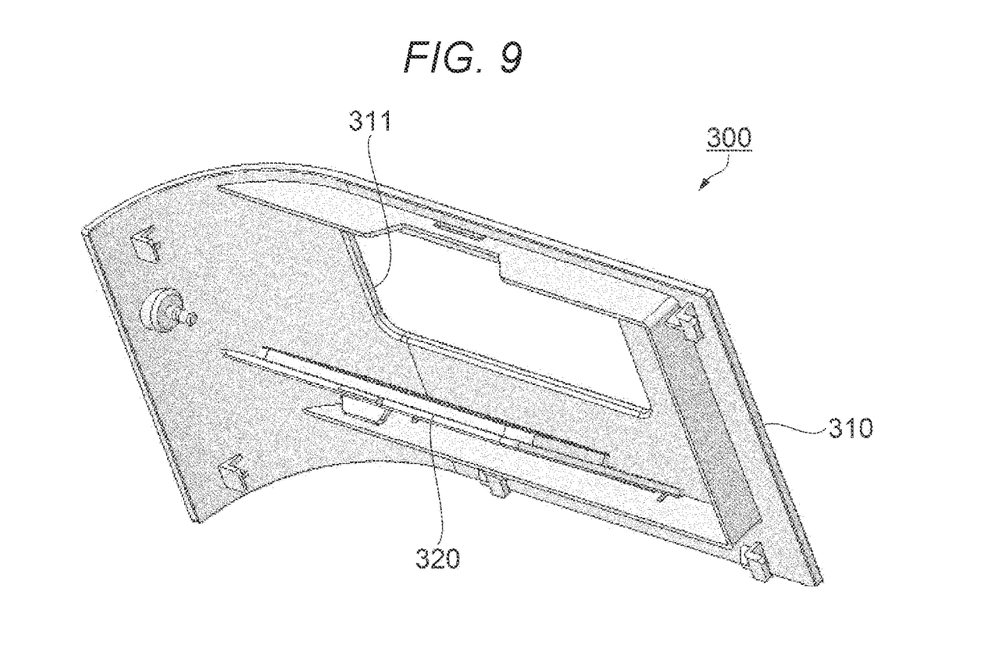
FIG. 9 is a perspective view showing a configuration of a cover part.
Figure 11:
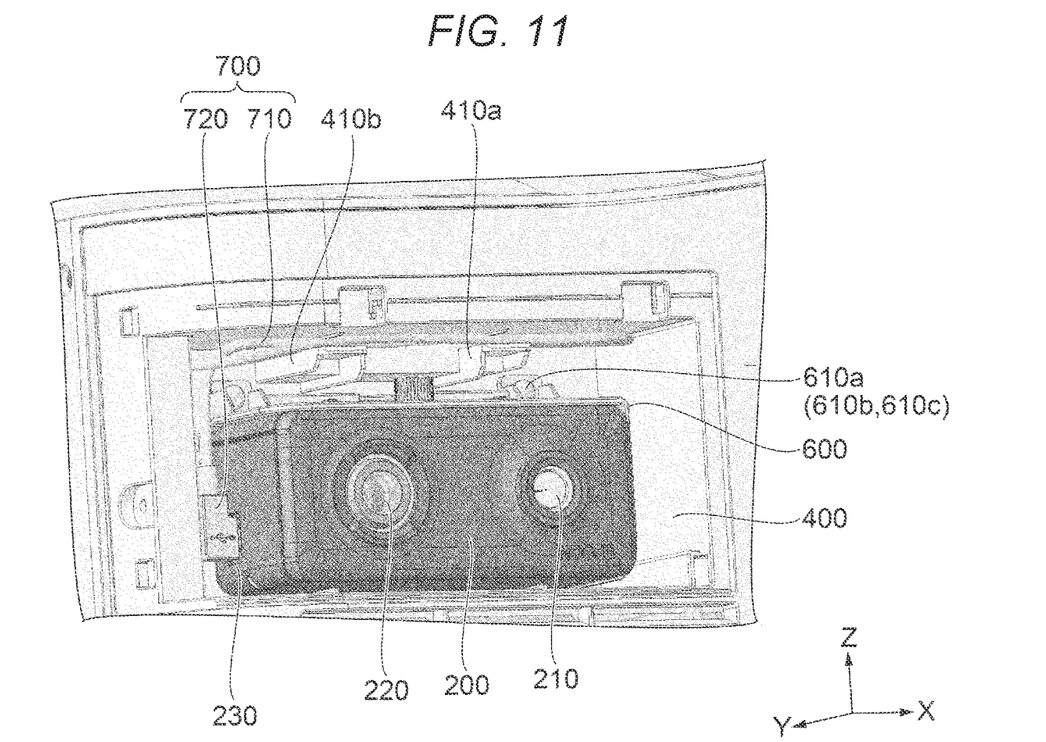
FIG. 11 is a perspective view showing a configuration of an inside of the housing section.

Then, as shown in FIG. 11, the imaging unit 200 fixed to the fixation member 600 is housed in the housing section 400. On this occasion, in order to open a portion corresponding to imaging lenses 210, 220 of the imaging unit 200 in the cover part 300, a second cover 320 in a portion corresponding to an opening part 311 is detached from a first cover 310 as shown in FIG. 9.

It should be noted that the imaging unit 200 in the present embodiment is provided with the two imaging lenses 210, 220 through which the image light is transmitted as shown in FIG. 11, but this is not a limitation, and it is possible for the imaging unit 200 to be formed of a single imaging lens. The second cover 320 is provided to the first cover 310 so as to be able to be opened and closed.

Figure 10:
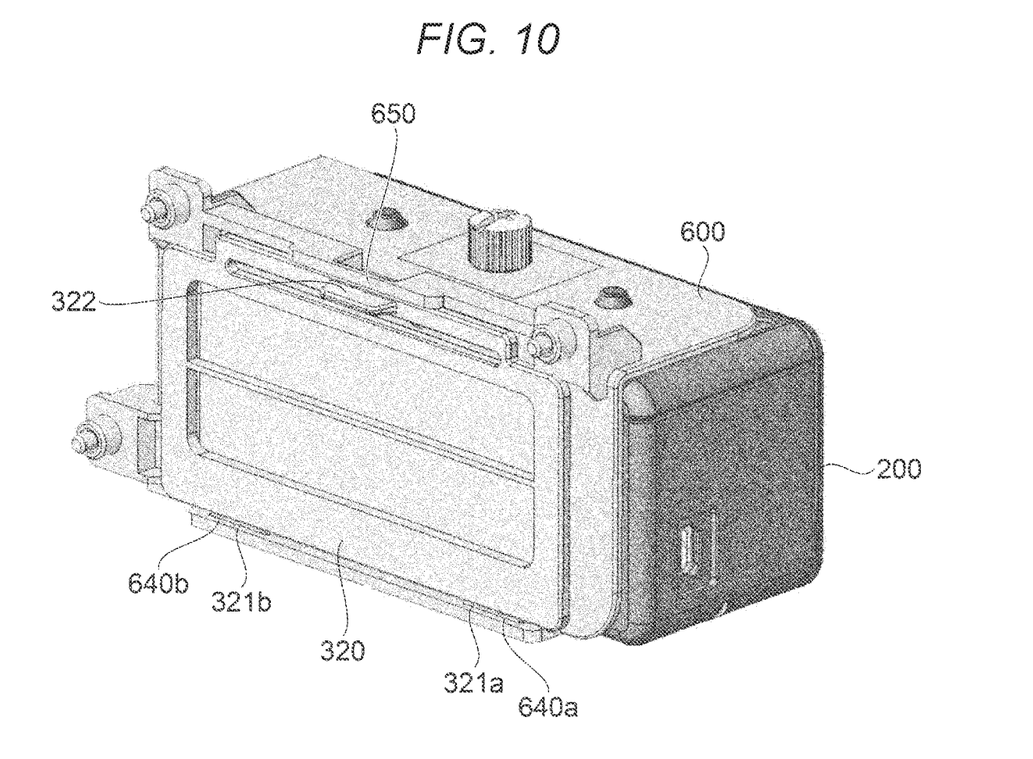
FIG. 10 is a perspective view showing a configuration of a reverse side of the fixation member.

It should be noted that the second cover 320 is fixed at an opposite side to the side at which the imaging unit 200 is attached in the fixation member 600 as shown in FIG. 10 so as to prevent the second cover 320 having been detached from being lost. As the fixation method, for example, protrusions 321a, 321b of the second cover 320 are fitted into opening holes 640a, 640b provided to the fixation member 600, and further, a resilient portion 322 of the second cover 320 is pressed into, and fixed to a fixation part 650 shaped like a protrusion provided to the fixation member 600.

Figure 12:
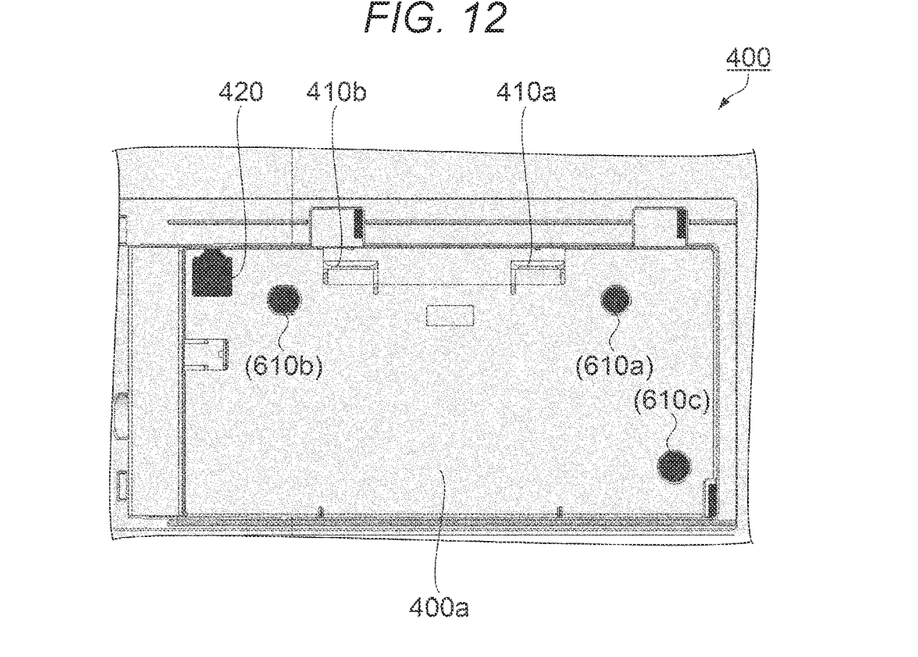
FIG. 12 is a front view showing the configuration of the inside of the housing section.

Then, as shown in FIG. 11, the imaging unit 200 is housed in the housing section 400. First, as shown in FIG. 12, a cable 700 which is electrically coupled to an inside of the projector 1000 via an opening hole 420 of the housing section 400, and is pulled out into the housing section 400 is further pulled out to an outside of the housing section 400.

As shown in FIG. 11, the cable 700 has a wiring part 710 and a connector 720 attached to a tip of the wiring part 710. The length of the cable 700 housed inside the housing section 400 is longer than the depth (in the +Y direction) of the housing section 400. Therefore, it is possible to pull out the cable 700 from the inside of the housing section 400 to the outside of the housing section 400.

Then, as shown in FIG. 11, the connector 720 is inserted into a coupling part 230 of the imaging unit 200 to electrically couple the cable 700 and the imaging unit 200 to each other. Subsequently, the imaging unit 200 is housed in the housing section 400. As shown in FIG. 12, the imaging unit 200 is fixed by attaching the fixation member 600 to the side surface 400a of the housing section 400 using the three screws 610a, 610b, and 610c.

Then, the cable 700 pulled out to the outside of the housing section 400 is housed inside the housing section 400. Specifically, as shown in FIG. 11 and FIG. 12, a superfluous portion of the cable 700 is folded to be inserted into a gap between support parts 410a, 410b arranged on the side surface 400a of the housing section 400 and the upper surface of the housing section 400 to thereby support the cable 700.

Figure 13:
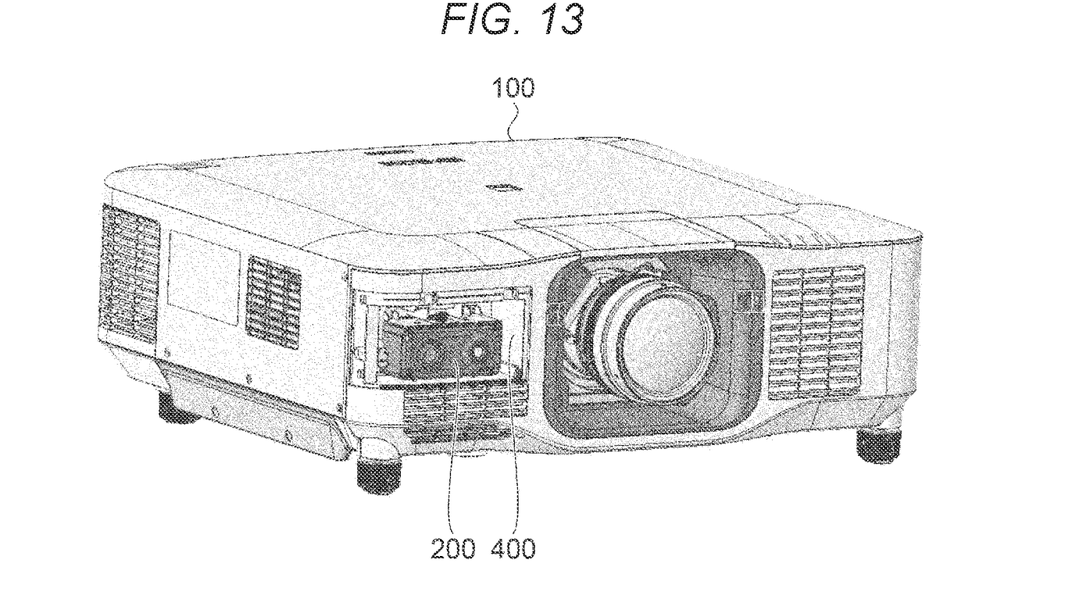
FIG. 13 is a perspective view showing the configuration of the projector.

Due to the process described hereinabove, as shown in FIG. 13, there is created the state in which the imaging unit 200 is housed in the housing section 400. Subsequently, by fitting the first cover 310 shown in FIG. 9 into the exterior chassis 100 so as to cover the housing section 400, it is possible to provide the projector 1000 of a built-in camera type as shown in FIG. 1.

By the user projecting the image light from the projector 1000, the controller 500 performs, for example, the distortion or focus adjustment of the image light based on the image light obtained by the imaging unit 200.

Figure 14:
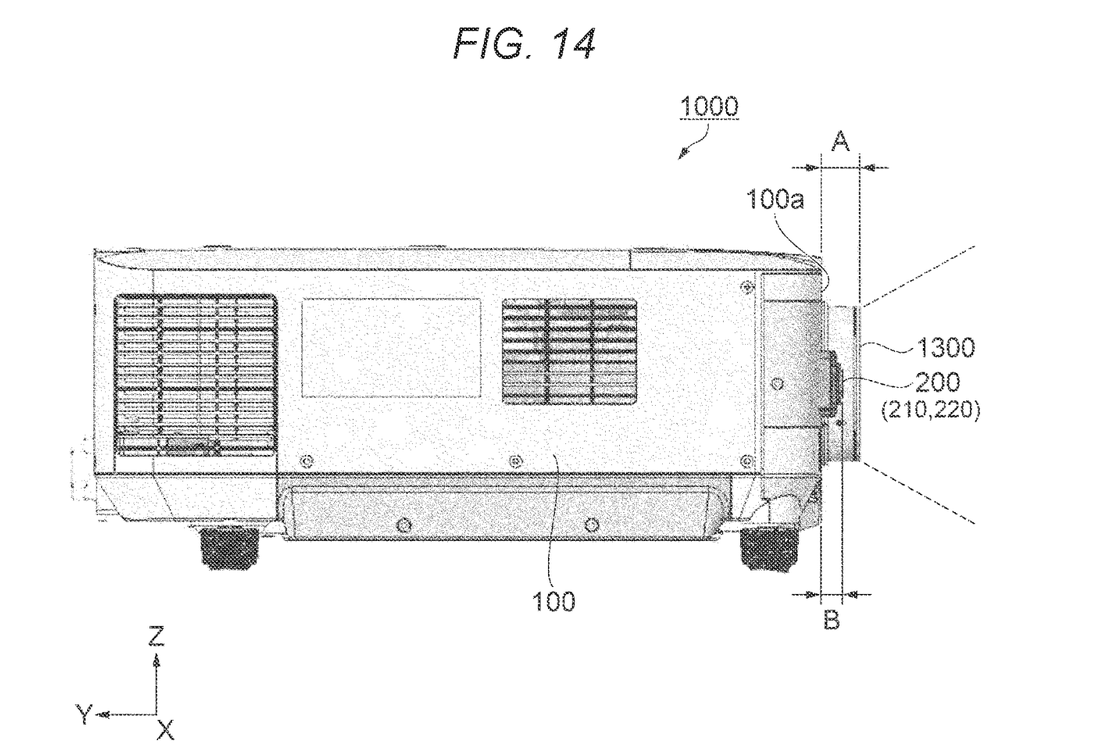
FIG. 14 is a side view showing the configuration of the projector.

It should be noted that although it is desirable for the imaging unit 200, in particular the imaging lenses 210, 220, not to project from the first surface 100a of the exterior chassis 100, it is sufficient for an amount B of the projection of the imaging unit 200 from the first surface 100a to be made smaller than at least an amount A of the projection of the projection optical unit 1300 from the first surface 100a as shown in FIG. 14. By adopting such an arrangement, it is possible to prevent the projector 1000 from growing in size.

Figure 15:
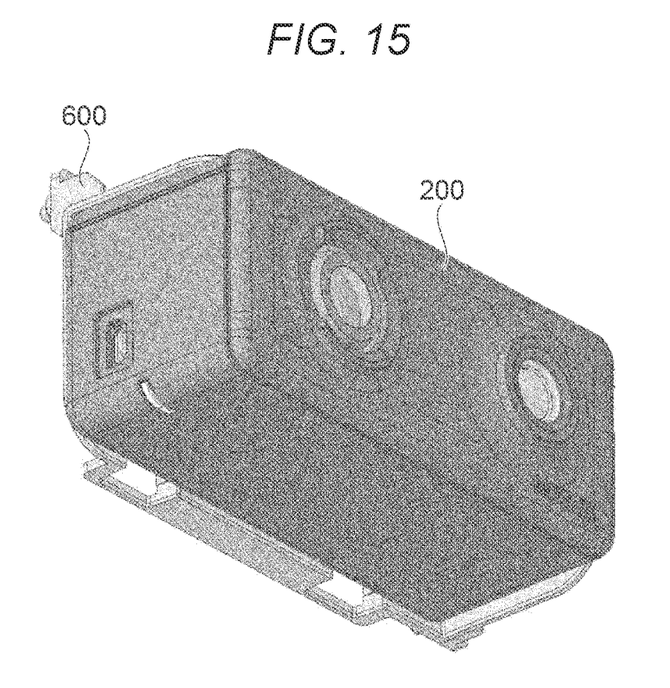
FIG. 15 is a perspective view showing the configuration when combining the imaging unit and the fixation member with each other.
Figure 16:
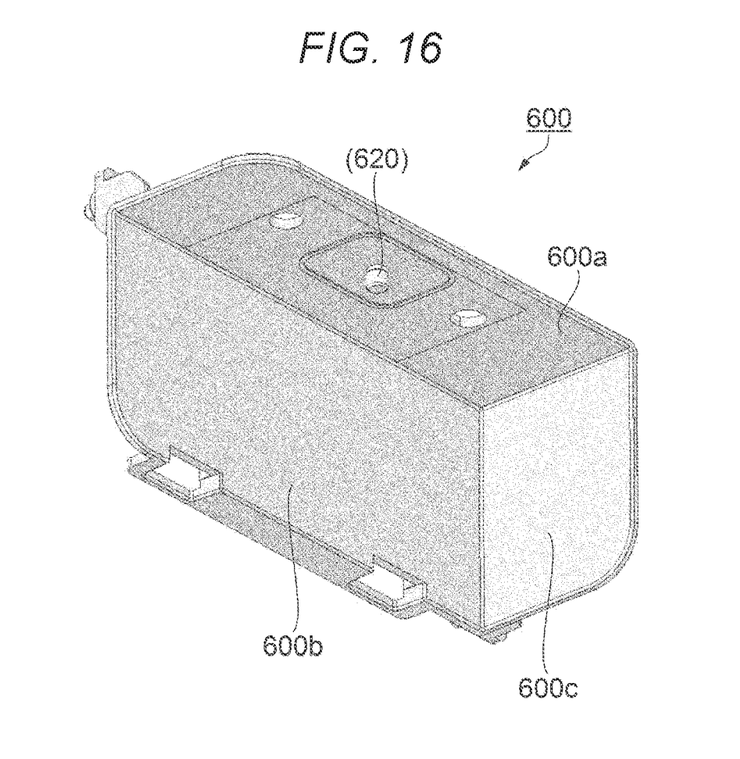
FIG. 16 is a perspective view showing a configuration of the fixation member.

Further, as shown in FIG. 15 and FIG. 16, it is desirable for the fixation member 600 to be provided with a first wall part 600a having the fixation screw 620 and the positioning mechanism, a second wall part 600b crossing the first wall part 600a, and a third wall part 600c crossing the first wall part 600a and the second wall part 600b. FIG. 15 shows a state in which the imaging unit 200 is attached to the fixation member 600. FIG. 16 shows a state in which the imaging unit 200 is detached from the fixation member 600 in the state shown in FIG. 15.

According to such a fixation member 600, since the three wall parts 600a, 600b, and 600c are provided to the fixation member 600, it is possible to make it easier to guide the imaging unit 200 in the positioning between the imaging unit 200 and the fixation member 600. Further, since the fixation member 600 is constituted by the three wall parts 600a, 600b, and 600c, it is possible to increase the strength of the fixation member 600.

It should be noted that although the description is presented using the example of attaching the imaging unit 200 to the projector 1000, it is possible to use the projector 1000 with the imaging unit 200 attached in advance. Further, it is desirable for the user to select the use of attachment and detachment of the imaging unit 200 to and from the projector 1000.

As described hereinabove, the projector 1000 according to the present embodiment is provided with the exterior chassis 100 provided with the housing section 400, the light source unit 1100 which is housed in the exterior chassis 100, and emits the light, the image forming unit 1200 which is housed in the exterior chassis 100, and generates the image light from the light, the projection optical unit 1300 which is attached to the exterior chassis 100, and projects the image light, and the imaging unit 200 which is detachably attached, and images the image light projected, wherein the imaging unit 200 is housed in the housing section 400.

According to this configuration, since the imaging unit 200 is housed in the housing section 400 to be housed in the exterior chassis 100, it becomes possible to reduce the projection from the exterior chassis 100 as much as the size of the housing section 400. Therefore, even when attaching the imaging unit 200, it is possible to prevent the projector 1000 from growing in size.

Further, the projector 1000 according to the present embodiment is provided with the exterior chassis 100, the housing section 400 which is provided to the exterior chassis 100, and in which the imaging unit 200 which is detachably attached, and images the image light projected is housed, the light source unit 1100 which is housed in the exterior chassis 100, and emits the light, the image forming unit 1200 which is housed in the exterior chassis 100, and generates the image light from the light, the projection optical unit 1300 which is attached to the exterior chassis 100, and projects the image light.

According to this configuration, since the housing section 400 in which the imaging unit 200 detachably attached is housed is provided to the exterior chassis 100, it becomes possible to reduce the projection from the exterior chassis 100 as much as the size of the housing section 400. Therefore, even when attaching the imaging unit 200, it is possible to prevent the projector 1000 from growing in size.

Further, in the projector 1000, it is preferable to provide the fixation member 600 which is housed in the housing section 400, and fixes the imaging unit 200, and to provide the fixation member 600 and the imaging unit 200 with the positioning mechanisms (the opening holes 630a, 630b, and the protrusions 200a, 200b) for determining the relative position therebetween. According to this configuration, since the positional relationship between the fixation member 600 and the imaging unit 200 is determined by the positioning mechanisms, it is possible to prevent the position of the imaging unit 200 from being shifted even when the fixation member 600 attached with the imaging unit 200 is housed in the housing section 400, or when an impact is applied to the projector 1000.

Further, in the projector 1000, the exterior chassis 100 has the first surface 100a as a surface on which the projection optical unit 1300 is disposed, and the amount B of the projection of the imaging unit 200 from the first surface 100a is smaller than the amount A of the projection of the projection optical unit 1300 from the first surface 100a. According to this configuration, even when attaching the imaging unit 200 to the projector 1000, it is possible to reduce the amount of the projection toward the first surface 100a of the projector 1000 (the projection side in the projector 1000), and it is possible to prevent the projector 1000 from growing in size.

Further, in the projector 1000, it is preferable for the exterior chassis 100 to have the first surface 100a as the surface on which the projection optical unit 1300 is disposed, and it is preferable for the imaging unit 200 not to project from the first surface 100a. According to this configuration, even when attaching the imaging unit 200 to the projector 1000, since the imaging unit 200 does not project toward the first surface 100a of the projector 1000 (the projection side in the projector 1000), it is possible to prevent the projector 1000 from growing in size. In addition, since the imaging unit 200 does not project from the exterior chassis 100, it is possible to improve the portability and the exterior appearance of the projector 1000.

Further, in the projector 1000, it is preferable for the exterior chassis 100 to have the cover part 300 which covers the housing section 400, and is capable of opening and closing. According to this configuration, since there is provided the cover part 300 for covering the housing section 400, it is possible to protect the imaging unit 200 from an impact and dust even when installing the imaging unit 200 in the housing section 400. Further, since the housing section 400 is covered with the cover part 300, it is possible to improve the exterior appearance of the projector 1000.

Further, in the projector 1000, it is preferable for the imaging unit 200 to be provided with the imaging lenses 210, 220 through which the image light is transmitted, and it is preferable for the cover part 300 to have the opening part 311 capable of opening and closing at the position corresponding to the imaging lenses 210, 220. According to this configuration, since there is disposed the opening part 311 at the position corresponding to the imaging lenses 210, 220, it is possible to protect the imaging unit 200, and at the same time, to image the image light even when attaching the cover part 300 to the exterior chassis 100. Further, it is possible to provide the projector 1000 having substantially the same function as that of the projector of the built-in camera type. In addition, since only the portion corresponding to the imaging lenses 210, 220 opens, it is possible to improve the exterior appearance.

Further, in the projector 1000, it is preferable for the fixation member 600 to be provided with the first wall part 600a provided with the positioning mechanism, the second wall part 600b disposed in a direction crossing the first wall part 600a, and the third wall part 600c disposed in a direction crossing the first all part 600a and the second wall part 600b. According to this configuration, since the fixation member 600 is provided with the three wall parts 600a, 600b, and 600c, it is possible to make it easier to guide the imaging unit 200 in the positioning between the imaging unit 200 and the fixation member 600. Further, since the fixation member 600 is constituted by the three wall parts 600a, 600b, and 600c, it is possible to increase the strength of the fixation member 600.

Further, in the projector 1000, it is preferable for the housing section 400 to be provided with the cable 700 having the connector 720 to electrically be coupled to the imaging unit 200, and the support parts 410a, 410b for supporting the cable 700, and it is preferable for the cable 700 extending in the housing section 400 to be longer in length than the depth of the housing section 400. According to this configuration, since the cable 700 is longer in length than the depth of the housing section 400, when attaching or detaching the imaging unit 200 to or from the fixation member 600, it is possible to perform the operation outside the exterior chassis 100. Further, by folding the cable 700 to be fixed to the support parts 410a, 410b, it is possible to compactly house the cable 700 long in length.

Hereinafter, a modified example of the embodiment described above will be described.

Figure 17:
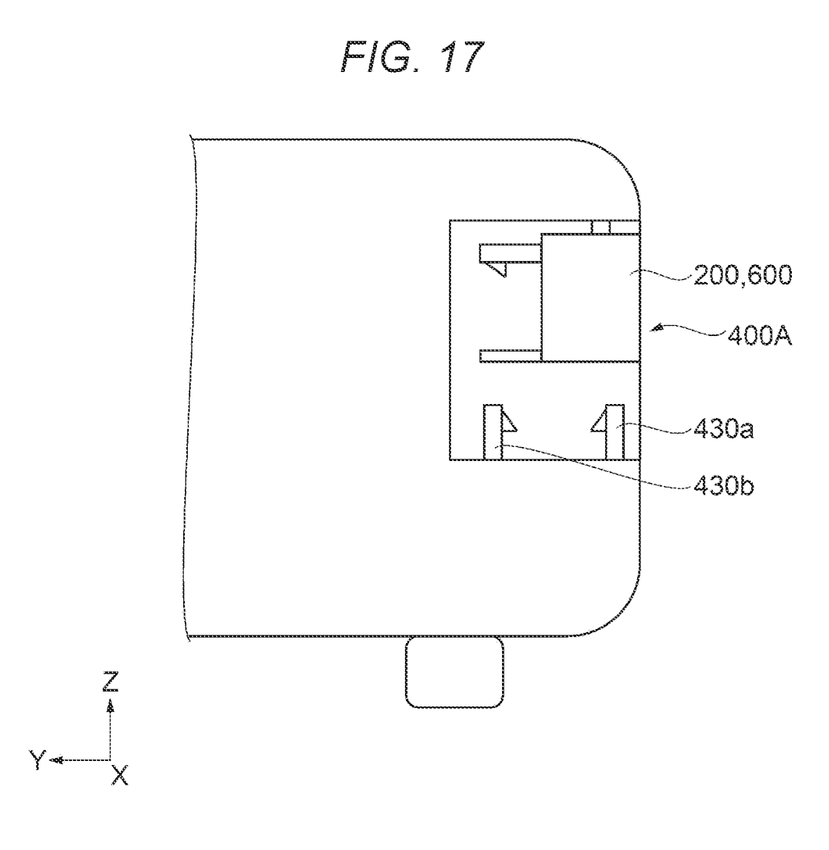
FIG. 17 is a cross-sectional view showing a configuration of a housing section in a modified example.

As described above, the configuration in which only the imaging unit 200 is housed in the housing section 400 is not a limitation, and it is possible to adopt, for example, a configuration shown in FIG. 17. As shown in FIG. 17, in a housing section 400A in the modified example, a housing region is expanded downward from the region where the imaging unit 200 is disposed. In the region thus expanded, it is possible to house a coupling target device other than the imaging unit 200.

It should be noted that it is desirable to dispose holding mechanisms 430a, 430b for holding the coupling target device in the housing section 400A. As the holding mechanisms 430a, 430b, there can be cited a resilient member such as a spring. Further, the coupling target device is made capable of wirelessly communicating with the projector 1000. Further, it is also possible to arrange that a device such as a wireless LAN or a body sensor is housed in the region thus expanded.

As described above, in the projector 1000 according to the modified example, it is preferable for the housing section 400A to be provided with the holding mechanisms 430a, 430b for holding the coupling target device to electrically be coupled to the projector 1000, and it is preferable for the housing section 400A to house the imaging unit 200 and the coupling target device. According to this configuration, since it is possible to house the two or more devices in the housing section 400A such as the imaging unit 200 and the coupling target device, it is possible to prevent the growth in size even when the plurality of devices and the projector 1000 are coupled to each other.

Further, as the method of fixing the imaging unit 200 to the exterior chassis 100, the imaging unit 200 is fixed to the side surface 400a of the housing section 400 with the screws 610a, 610b, and 610c via the fixation member 600, but this is not a limitation, and it is possible to adopt a sliding method, biasing with a biasing member, or the like.

Further, the position of the coupling part 230 of the imaging unit 200 can be arranged at an opposite side to the position in the embodiment described above. Further, it is also possible to arrange that the position of the third wall part 600c constituting the fixation member 600 is also arranged at an opposite side in accordance with the position of the coupling part 230. Further, it is possible to arrange that the position of the coupling part 230 is arranged on upper and lower surfaces of the imaging unit 200.

Further, the imaging unit 200 is not limited to the arrangement of being arranged at the front side (the first surface 100a side) of the exterior chassis 100, and it is sufficient for the imaging unit 200 to be able to image the image light projected, and when, for example, the imaging unit 200 is arranged at a position other than the front side, it is possible to arrange to perform imaging in a folded manner, or when being applied to a single focus type projector, it is possible to arrange the imaging unit 200 on an upper surface or a lower surface of the exterior chassis.

Further, the positioning mechanisms for determining the positions of the fixation member 600 and the imaging unit 200 are not limited to the configuration of the embodiment described above, and it is possible to arrange that, for example, the opening hole is formed at the imaging unit 200 side, and the protrusion is provided to the fixation member 600.

Further, the screw 620 for attaching the imaging unit 200 to the fixation member 600 is not limited to just one type, and it is possible to form a screw of, for example, a camera standard, or it is possible to arrange to form a versatile screw. Further, the same applies to the screw for attaching the fixation member 600 to the housing section 400.

Further, in order to improve the impact resistance of the imaging unit 200, it is possible to arrange to dispose the resilient member between the fixation member 600 and the exterior chassis 100.

Further, the cover part 300 is not limited to one formed of a general resin having a non-light transmissive property, and can also be formed using a transparent material such as glass.

What is claimed is:

1. A projector which projects image light and an imaging unit which images the image light projected by the projector, the projector comprising:
    an exterior chassis provided with a housing section;
    a light source unit housed in the exterior chassis and configured to emit light;
    an image formation unit housed in the exterior chassis and configured to generate the image light from the light;
    a projection optical unit attached to the exterior chassis and configured to project the image light; and
    a fixation member housed in the housing section and configured to fix the imaging unit, wherein
    the imaging unit is housed in the housing section,
    the imaging unit is detachably attached to the projector, and
    the fixation member and the imaging unit have a positioning mechanism configured to determine a relative position between the fixation member and the imaging unit.

2. The projector according to claim 1, wherein
    the housing section is a portion of the exterior chassis recessed inward toward an interior portion of the projector.

3. A projector comprising:
    an exterior chassis;
    a light source unit housed in the exterior chassis and configured to emit light;
    an image formation unit housed in the exterior chassis and configured to generate image light from the light;
    a projection optical unit attached to the exterior chassis and configured to project the image light;
    a housing section defined by the exterior chassis and configured to house an imaging unit, the imaging unit being detachably attached to the housing section and imaging the image light projected from the projection optical unit; and
    a fixation member housed in the housing section and configured to fix the imaging unit, wherein
    the projector is configured to be detached from the imaging unit, and
    the fixation member and the imaging unit have a positioning mechanism configured to determine a relative position between the fixation member and the imaging unit.

4. The projector according to claim 3, wherein
    the exterior chassis has a first surface on which the projection optical unit is disposed, and
    an amount of protrusion of the imaging unit from the first surface is smaller than an amount of protrusion of the projection optical unit from the first surface.

5. The projector according to claim 3, wherein
    the exterior chassis has a first surface on which the projection optical unit is disposed, and
    the imaging unit fails to protrude from the first surface.

6. The projector according to claim 3, wherein
    the exterior chassis has a cover part which is configured to open and close, and
    the cover part covers the housing section when the cover closed.

7. The projector according to claim 6, wherein
    the imaging unit has an imaging lens through which the image light is transmitted, and
    the cover part has an opening part located at a position corresponding to the imaging lens and configured to open and close.

8. The projector according to claim 3, wherein
    the fixation member includes
        a first wall part having the positioning mechanism,
        a second wall part disposed in a direction crossing the first wall part, and
        a third wall part disposed in a direction crossing the first wall part and the second wall part.

9. The projector according to claim 3, further comprising:
    a cable provided on the housing section and having a connector which is electrically coupled to the imaging unit, and
    a support part provided on the housing section and supporting the cable, wherein
    a length of the cable extending in the housing section is longer than a depth of the housing section.

10. The projector according to claim 3, wherein
    the housing section has a holding mechanism holding a coupling device which is electrically coupled to the projector, and
    the housing section houses the imaging unit and the coupling device.

11. The projector according to claim 3, wherein
    the housing section is a portion of the exterior chassis recessed inward toward an interior portion of the projector.

12. A projector comprising:
    an exterior chassis;
    a light source unit housed in the exterior chassis and configured to emit light;
    an image formation unit housed in the exterior chassis and configured to generate image light from the light;
    a projection optical unit attached to the exterior chassis and configured to project the image light;
    a housing section defined by the exterior chassis and configured to house an imaging unit, the imaging unit being detachably attached to the housing section and imaging the image light projected from the projection optical unit; and
    a fixation member housed in the housing section and configured to fix the imaging unit, wherein the projector is configured to be detached from the imaging unit, the fixation member is detachably coupled to the exterior chassis, and the imaging unit is detachably coupled to the fixation member.

* * * * *